(12) United States Patent
Sieber (10) Patent No.: US 9,689,369 B2
(45) Date of Patent: Jun. 27, 2017

(54) ENDLESS BELT ENERGY CONVERTER

(71) Applicant: Joseph Sieber, Qualicum Beach (CA)

(72) Inventor: Joseph Sieber, Qualicum Beach (CA)

(*) Notice: Subject to any disclaimer, the term of this patent is extended or adjusted under 35 U.S.C. 154(b) by 142 days.

(21) Appl. No.: 14/379,300

(22) PCT Filed: Feb. 15, 2013

(86) PCT No.: PCT/CA2013/050116
§ 371 (c)(1),
(2) Date: Aug. 17, 2014

(87) PCT Pub. No.: WO2013/120203
PCT Pub. Date: Aug. 22, 2013

(65) Prior Publication Data
US 2015/0285210 A1   Oct. 8, 2015

Related U.S. Application Data (60) Provisional application No. 61/599,933, filed on Feb. 17, 2012.

(51) Int. Cl.
| | | |
|---|---|---|
| *F03B 13/12* | (2006.01) | |
| *F03D 5/02* | (2006.01) | |
| *F03B 17/06* | (2006.01) | |
| *F01D 23/00* | (2006.01) | |
| *F03B 9/00* | (2006.01) | |
| *F03D 9/00* | (2016.01) | |
| *F03B 13/26* | (2006.01) | |

(52) U.S. Cl.
CPC ............. *F03B 13/12* (2013.01); *F01D 23/00* (2013.01); *F03B 9/00* (2013.01); *F03B 13/264* (2013.01); *F03B 17/06* (2013.01); *F03B 17/066* (2013.01); *F03D 5/02* (2013.01); *F03D 9/008* (2013.01); *F05B 2240/40* (2013.01); *F05B 2240/93* (2013.01); *Y02E 10/28* (2013.01); *Y02E 10/70* (2013.01)

(58) Field of Classification Search
CPC .... F03B 17/066; F03B 17/064; F03B 17/068; F03B 13/264; F03B 7/006; F03B 7/003; F03B 9/00; F03B 9/005; F03D 5/02; F03D 9/008; F01D 23/00; F05B 2240/93; F05B 2210/16; F05B 2210/18; F05B 2240/932
USPC ..................................... 60/495, 496
See application file for complete search history.

(56) References Cited

U.S. PATENT DOCUMENTS

| | | | | |
|---|---|---|---|---|
| 56,660 | A * | 7/1866 | Young ................ | F03B 17/064 416/7 |
| 192,563 | A * | 7/1877 | Carroll ............... | F03B 17/064 416/7 |
| 586,915 | A * | 7/1897 | Pond .................. | F03B 17/064 416/7 |
| 810,507 | A * | 1/1906 | Parkerson .......... | F03B 17/066 416/8 |

(Continued)

*Primary Examiner* — Mark Laurenzi
*Assistant Examiner* — Xiaoting Hu
(74) *Attorney, Agent, or Firm* — Clark Wilson LLP (57) ABSTRACT

The present invention relates to a way to convert energy from a fluid flow, using a fluid-flow transducer, having a frame anchorable against the flow, an elongated conveyor supported by the frame, and a plurality of vanes distributed along the conveyor, adapted to engage the fluid flow and to drive the conveyor in response to urging of the fluid flow, in combination with a power take-off coupled to be driven by the conveyor and adapted to drive a load.

19 Claims, 12 Drawing Sheets

(56) References Cited

U.S. PATENT DOCUMENTS

| | | | | |
|---|---|---|---|---|
| 849,311 | A * | 4/1907 | Auld | F03B 17/066 416/10 |
| 870,225 | A * | 11/1907 | Campbell | F03B 17/066 416/8 |
| 880,509 | A * | 3/1908 | Davis | F03B 17/066 198/732 |
| 922,890 | A * | 5/1909 | Hansen | F03B 7/006 415/5 |
| 1,034,603 | A * | 8/1912 | Farley | F03B 17/066 405/75 |
| 4,316,704 | A * | 2/1982 | Heidt | F03B 13/20 417/100 |
| 4,494,008 | A * | 1/1985 | Patton | F01D 23/00 290/44 |
| 7,566,983 | B1 * | 7/2009 | Lyatkher | F03D 9/008 290/43 |
| 2003/0014969 | A1 * | 1/2003 | Walters | F03B 17/063 60/398 |
| 2009/0015015 | A1 * | 1/2009 | Joutsiniemi | F03B 17/062 290/54 |
| 2010/0181773 | A1 * | 7/2010 | Reist | F03B 17/066 290/54 |
| 2010/0289264 | A1 * | 11/2010 | Lee | F03B 17/068 290/44 |
| 2011/0254275 | A1 * | 10/2011 | Joseph | F03B 13/144 290/53 |
| 2012/0043764 | A1 * | 2/2012 | Kim | B63H 21/20 290/55 |

* cited by examiner

ENDLESS BELT ENERGY CONVERTER

CROSS REFERENCE TO RELATED APPLICATIONS

This application claims priority from U.S. Provisional Patent Application Ser. No. US61/599,933 filed on Feb. 17, 2012, entitled Generator, which is expressly incorporated by reference herein to the extent permitted by law.

BACKGROUND

1. Field

The present invention relates to ways to generate energy by harnessing, transducing, extracting or otherwise converting the kinetic energy of a flowing fluid, including flowing air currents (including wind currents) and flowing water currents (including ocean currents, for example tidal currents, and watercourse currents, for example river currents). In this document, in the absence of contrary indication, the words generate, harness, transduce, extract and convert, in all their various forms, will be used interchangeably.

2. Description of Related Art

Terrestrial wind turbines have shown considerable success; however, they have many shortcomings. They are costly to build and deploy and are prone to damage under severe wind conditions. Their massive size and noisiness make them unattractive to some people. Some people have expressed concerns that such turbines present a health hazard to people and birds, that they affect local weather patterns and that they may affect farming. These concerns are prompting increasingly large and much more expensive offshore deployment of wind turbines.

Nevertheless, the success enjoyed by wind turbines, when the air currents are blowing just right, has enticed some to directly apply this concept to water current energy retrieval. This conventional reasoning suggests that because the density of water is about 800 times greater than that of air, therefore the concentration of energy must also be that much greater, resulting in the need for a much smaller device to extract the same energy. Unfortunately, many popular designs have focused on this oversimplified analogy, ignoring other forces that come into play. One must even be careful in applying concepts drawn from penstock-fed hydraulic turbines in hydroelectric systems.

Installing a water generator submerged in a water flow, for example a tidal current, exposes the generator to uneven and very significant forces, with water being 800 times denser than air. This is the case whether we use a vertical axis or a horizontal axis of rotation. These uneven forces, plus the resistive forces encountered by rotating vanes trying to cut through the dense water medium, have resulted in failures to apparently very substantial devices, thus providing power outputs that pale in comparison to the predicted ratings.

Thus for example, a tidal current stream is typically very slow, relatively speaking, and the water immediately beyond the turbine blades is still present in full force to slow down the turbine rotation. This resistive force, slowing down the envisioned turbine rotation, is almost as great as the forward force of the tidal current that conventional wisdom is attempting to utilize. To illustrate, if we manually or mechanically attempted to spin the turbine at the expected running speed, and while the tidal current speed is nil, we would discover that the required energy is absolutely immense. Almost all of this required energy, or drag, would have to be overcome by the forward force of the tidal current, not to mention what additional energy is required to drive a power take-off to provide the expected power output.

In a hydraulic system, the water stream in the penstock travels at a considerable speed when it reaches the turbine, dependent on the vertical drop, and the turbine spins accordingly fast. The water stream immediately beyond the hydraulic turbine continues to drop and is on the verge of creating cavitations. What this means is that the downstream side of the hydraulic turbine does not have to slice its way through the dense water medium. There is minimal drag, or energy loss. In essence, the turbine spins freely with respect to the downstream side, and is relatively unencumbered.

A similar environment besets a wind turbine. When there is no wind blowing, and if we attempted to rotate the turbine at the rotational speed of operation, we would likewise find that the required energy is immense. Almost all of this required energy, or drag, would have to be overcome by the forward force of the wind, not to mention what additional energy is required to drive a power take-off to provide the expected power output.

There are several tidal current turbines being tested, and we read about their unexpected failures, or we hear nothing about the low and unpublished results. All the blades are torn off one machine, while another is retrieved to prevent total destruction. And so the story goes, with the expected power output of those that have survived being unreachable, being unexpectedly low and/or unpublished.

Devices like waterwheels are caused to operate by the weight of falling water at the circumference of the wheel. Others may be caused to operate by the force of the flowing water on the lower submerged portion of the wheel. In this case the effective lateral force relates directly to the point on the circumference and its submergence. The force is not uniform over the arc of submergence, because the force is strictly lateral acting on a circular and revolving member.

Paddle boats have similar limitations. In this case, for balanced drive, there is a wheel on both sides of the boat. Regardless, the force coming from the engine room is not uniformly applied in the lateral dimension. When the wheel first touches the waterline, a portion of the applied force is downward and is wasted, as it is when the wheel approaches emergence from the water medium, a portion of the applied force is upward and is likewise wasted. The most efficient application of the applied force is at the point where it impacts on the perpendicular radius to the direction of flow.

The rotational force over a lateral distance, described above, is not as efficient as a lateral force over the same distance. Further, none of these applications above can match a continuous lateral force over an identical distance.

Accordingly, what is needed is a better way to capture the almost limitless green-house-gas-emissions-free renewable and sustainable energy, at a lower cost in capital investment, operations and maintenance and with increased energy capture per ton of fabricated material.

SUMMARY

The present invention is directed to this need.

According to one aspect of the present invention, there is provided an apparatus for generating energy from a fluid flow, which includes a flow transducer that transduces energy from a flowing fluid.

According to one aspect of the present invention, there is provided an apparatus for generating energy from a liquid flow, which includes a liquid flow transducer that transduces energy from a flowing liquid, for example a tidal current, an ocean stream or a river stream.

According to another aspect of the present invention, there is provided an apparatus for generating energy from a gas flow, which includes a gas flow transducer that transduces energy from a flowing gas, for example air, for example wind. Terrestrial applications can be sited anywhere, because of their low profile, with a special emphasis on roof-tops of industrial buildings.

According to another aspect of the present invention, the liquid flow transducer and the gas flow transducer cooperate synergistically to generate energy from proximate fluid flows.

Marine applications of fluid flow transducers can be deployed anywhere on the ocean's surface or in rivers and river estuaries where there is measurable current velocity. Such locations are also often blessed with significant wind velocities, and hence the opportunity to simultaneously harness the energy of the prevalent wind stream to drive an adjacent or common generator. Doing so on a single installation automatically enhances the utilization factor.

According to one aspect of the present invention, there is provided an apparatus for converting energy from a fluid flow, including a first fluid-flow transducer, having a frame anchorable against the flow, an elongated conveyor supported by the frame, and a plurality of vanes distributed along the conveyor, adapted to engage the fluid flow and to drive the conveyor in response to urging of the fluid flow, and a power take-off coupled to be driven by the conveyor and adapted to drive a load.

At least one of the plurality of vanes may have an extended position and a retracted position. At least one of the plurality of vanes may have at least one passage therethrough.

The conveyor may include a plurality of rollers, each roller respectively extending transversely across the frame and the plurality of rollers extending longitudinally along the frame, and a closed belt engaging the plurality of rollers for travel thereover.

The first fluid-flow transducer may be a liquid-flow transducer and the plurality of vanes may include flotation sufficient to support the apparatus. The plurality of vanes may be even in number, for example six.

The first fluid-flow transducer may be a gas-flow transducer. At least one of the plurality of vanes may have an energy-accumulator coupled to extract energy from it when it moves between the retracted position and the extended position. The conveyor may be supported on the frame via a turntable.

The apparatus may include a second fluid-flow transducer coupled to the power take-off. The first fluid-flow transducer and the second fluid-flow transducer may both be liquid-flow transducers, for example connected together in a fixed, parallel array. The first fluid-flow transducer and the second fluid-flow transducer may be connected together in a pivoting array; the pivoting array may include a further plurality of fluid-flow transducers pivotally connected together along a path.

The first fluid-flow transducer may be a liquid-flow transducer and the second fluid-flow transducer may be a gas-flow transducer. The first fluid-flow transducer may support a superstructure that supports the second fluid-flow transducer. The first fluid-flow transducer may support the superstructure with a plurality of translation-couplings.

According to another aspect of the present invention, there is provided a method of converting energy from a fluid flow, including distributing a plurality of vanes along an elongated conveyor and anchoring the conveyor proximate the flow such that some of the plurality of vanes are urged upon by the flow and in response urge the conveyor into motion. The method may further include supporting the conveyor on the flow with the some of the plurality of vanes urged upon by the flow.

Further aspects and advantages of the present invention will become apparent upon considering the following drawings, description, and claims.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

In the document, a reference label "a" is used to particularly designate an element of liquid-flow transducer and a reference label "b" is used to particularly designate an element of a gas-flow transducer. In this document, prime, double prime and triple prime reference labels are used to particularly designate an element of a first embodiment, second embodiment and third embodiment liquid-flow transducer respectively.

BRIEF DESCRIPTION OF THE DRAWINGS

FIG. 6b is a front elevation of a scoop on the liquid-flow transducer of FIG. 6a.

DETAILED DESCRIPTION OF SPECIFIC EMBODIMENTS (a) General Overview

With reference to FIGS. 1-12, there will now be described various exemplary embodiments of a converting apparatus 100 that includes a fluid-flow transducer 101, and more particularly a liquid-flow transducer 101*a* and/or a gas-flow transducer 101*b*.

(i) First General Approach: Liquid Flow

A first general approach focuses on harnessing the energy in a liquid flow, for example a water flow, for example a tidal current, an ocean stream or a river stream.

Figure 1:
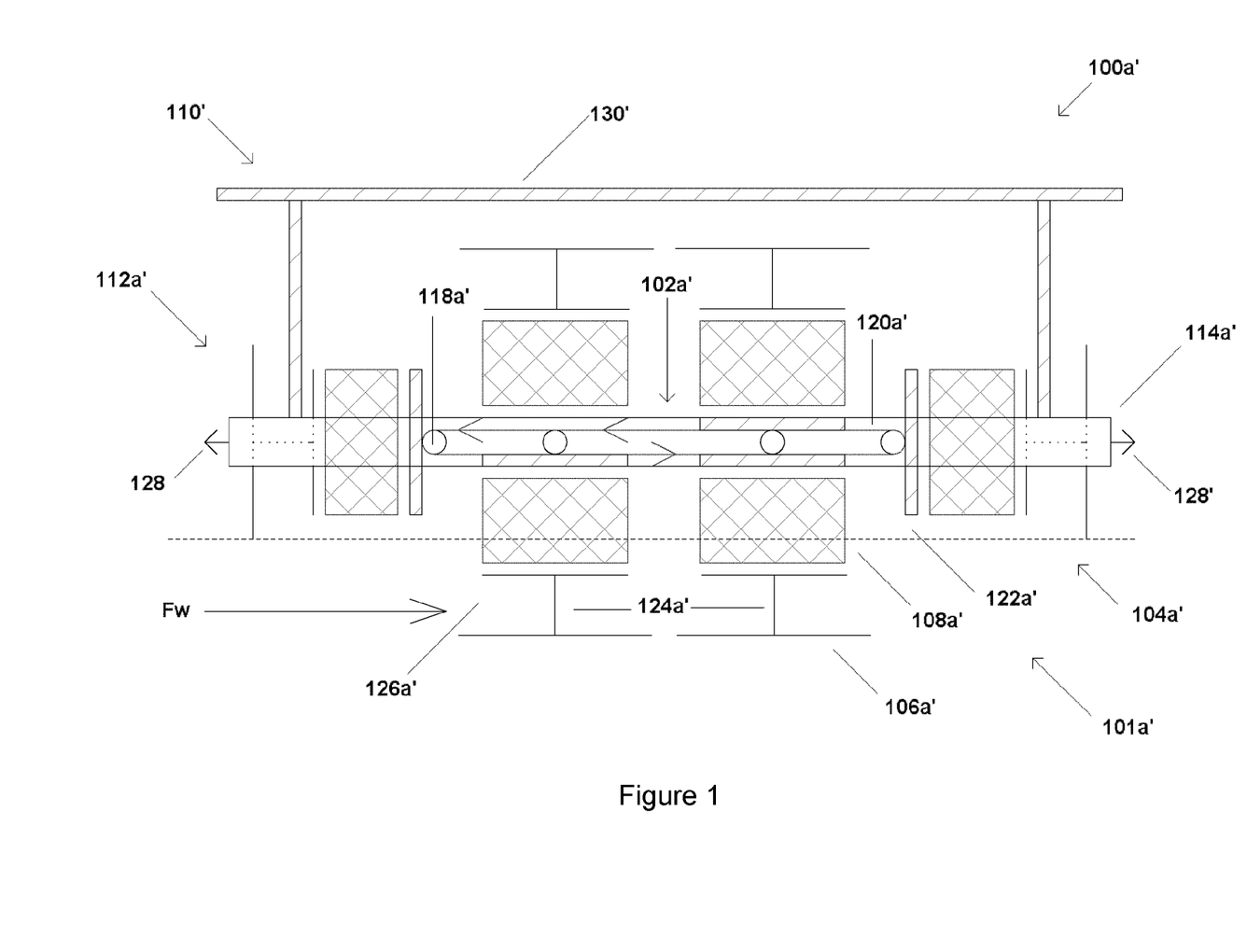
FIG. 1 is a side elevation of a first embodiment of a fluid-flow transducer—a liquid-flow transducer in accordance with aspects of the present invention.

As illustrated for example in FIG. 1, an embodiment of this approach might include a liquid-flow transducer 101*a*. The liquid-flow transducer 101*a* might be mounted on a floating vessel (not shown), for example a powered vessel or a barge, anchored in a tidal current stream. The liquid-flow transducer 101*a* includes an elongated conveyor 102*a* along which are distributed a plurality of vanes 104*a*. The conveyor 102*a* is so aligned with the tidal flow Fw such that those of the vanes 104*a* immersed in the flow are propelled backward, thereby driving the conveyor 102*a*, which advances other vanes 104*a* into the flow Fw.

In essence, these vanes 104*a* have similarities to continuous tracks (also known as caterpillar tracks or tank treads) commonly found on heavy equipment, with the vanes 104*a* returning to the front of the vessel (not shown) in the less dense air medium above the water flow Fw. Mechanically coupled to a load L, for example a generator on the surface deck of the vessel (not shown), the conveyor 102*a* could drive the load L.

This arrangement, comprising a small barge and a conveyor 102*a* of comparatively large vanes 104*a* on each side, would be a significant tidal current energy capture device, superior for example to the inverse of the paddle boat concept. Although such a vessel aids in visualizing this approach, the vessel itself is a large and unnecessary drag in the tidal current flow Fw, a drag that needs to be harnessed and eliminated with the opportunity of capturing a much greater amount of energy. By analogy, one may observe a tugboat pulling on a log boom. This effort is frequently observed with the tugboat making minimal progress against a tidal current. The power put to the task is usually a few thousand horsepower diesel engine, which illustrates the immense energy in the tidal flow Fw. One can quickly imagine that instead of a relatively smooth contoured log boom, the towing power required would be considerably increased if scoops projected downward from it.

Inverting this need for a vast amount of power to move a floating object, we may consider instead converting that power of the tidal flow Fw to generate energy. Instead of a vessel to position the liquid-flow transducer 101*a* on the surface of the tidal current flow Fw, we can re-design the liquid-flow transducer 101*a* to include large blocks of floatation 108*a*. More particularly, we can construct each vane 104*a* as a water scoop 106*a* connected to floatation 108*a*, which is in turn connected to a mounting-plate 122*a*, which is in turn connected to the conveyor 102*a*. In combination, each such constructed vane 104*a* that is in contact with the tidal current flow Fw would have sufficient buoyancy to keep the entire liquid-flow transducer 101*a* and its superstructure 110 all afloat, with each vane 104*a* in turn returning to the front of the liquid-flow transducer 101*a* in the less dense air medium above the tidal current flow Fw. As for the superstructure 110, the entire non-moving assembly above the floatation 108 would be anchored, for example permanently and immovably, fore and aft with anchors (not shown) made from concrete or other benign material.

(ii) Second General Approach: Gas Flow

A second general approach focuses on harnessing the energy in a gas flow, for example a wind.

Figure 7:
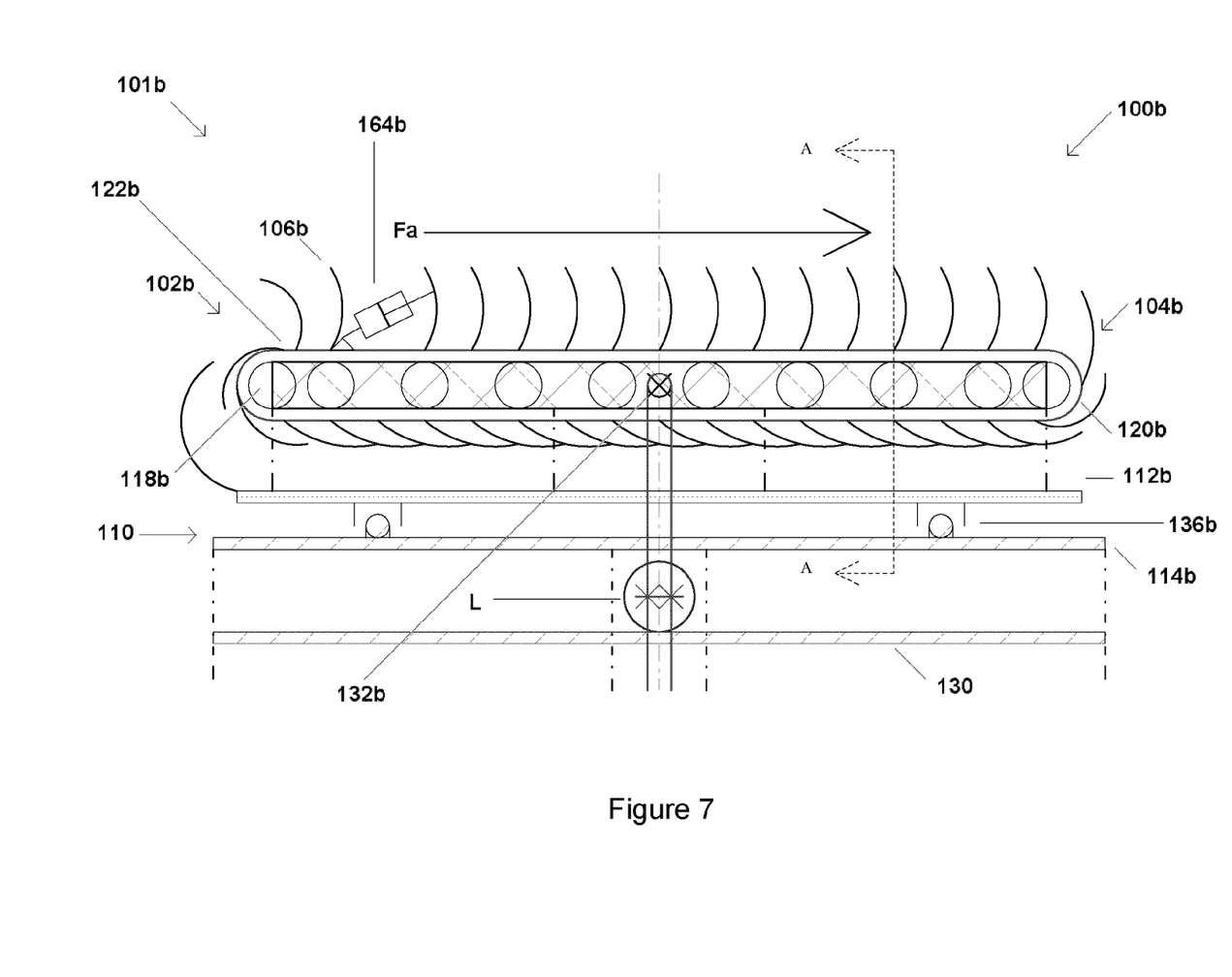
FIG. 7 is a side elevation of a fourth embodiment of a fluid-flow transducer—a gas-flow transducer in accordance with aspects of the present invention.

As illustrated in FIG. 7 for example, an embodiment of this approach might include a gas-flow transducer 101*b*. The design of the gas-flow transducer 101*b* applies many of the same concepts as the liquid-flow transducer 101*a*, but with applications suitable for an air environment. In place of water scoops 106, the gas-flow transducer 101*b* has sails 106*b*. The gas-flow transducer 101*b* can combine synergistically with the liquid-flow transducer 101*a*, and is mountable on a large turntable 136*b* on the superstructure 110 of the liquid-flow transducer 101*a* to account for situations where the direction of the air flow Fa is not aligned with the direction of the water flow Fw. In this regard, the liquid-flow transducer 101*a* and gas-flow transducer 101*b* can be connected to drive a common load L, for example a generator.

(b) Structure of Specific Embodiments

The structure of the invention will now be further illustrated by explanation of specific, non-limiting, exemplary embodiments shown in the drawing figures, described in greater detail herein.

(i) First Embodiment

Figure 2:
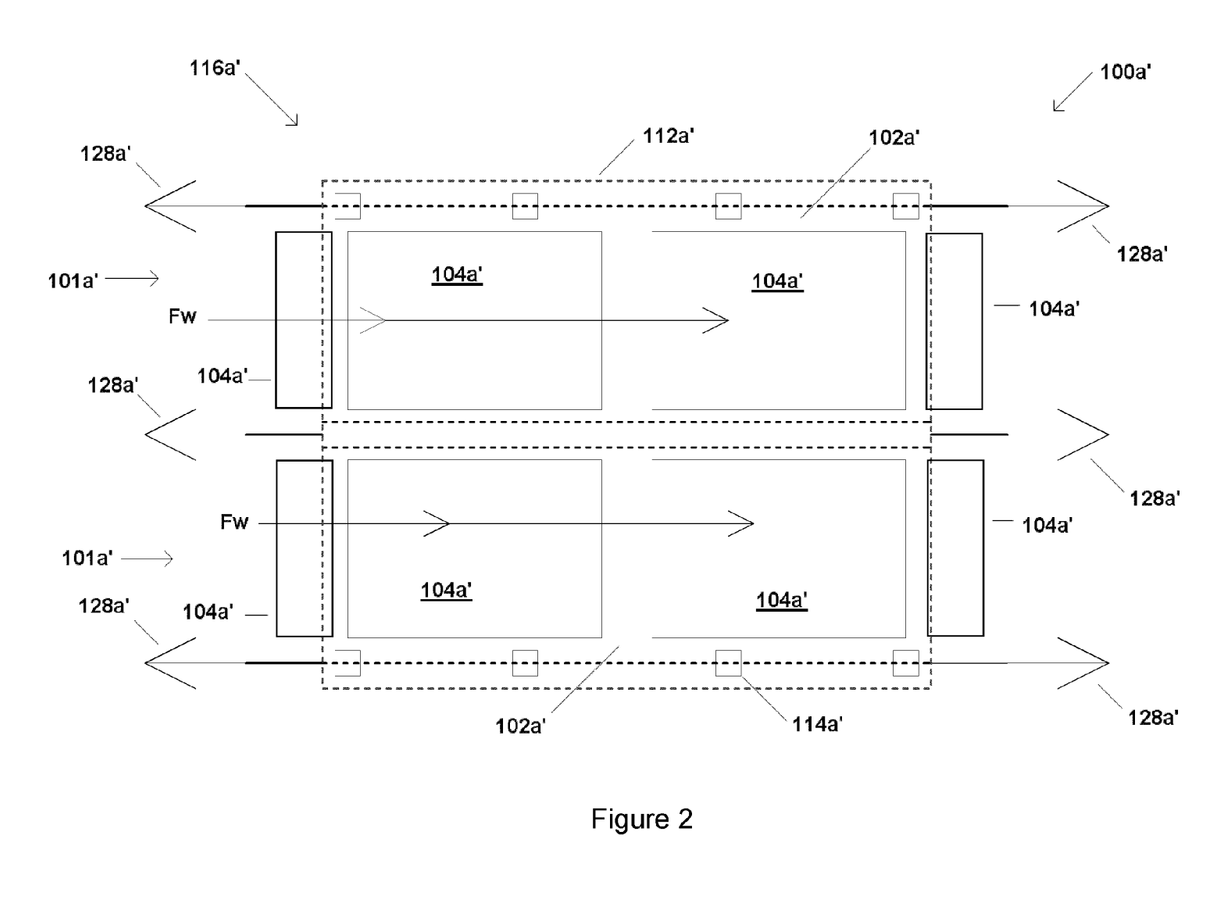
FIG. 2 is a plan view of two liquid-flow transducers of FIG. 1 connected into a fixed, parallel array.

With reference to FIGS. 1 and 2, a first embodiment of a liquid-flow transducer 101*a*' is generally illustrated in side elevation and plan views. The liquid-flow transducer 101*a*' is built on a frame 112*a*' of web beams 114*a*'. The frame 112*a*' additionally provides a way to connect together multiple liquid-flow transducers 101*a*' into an array 116, for example a fixed, parallel array 116' of liquid-flow transducers 101*a*' as seen in FIG. 2. Such arraying provides not only additional generating capacity, but also stability.

The frame 112*a*' supports a conveyor 102*a*', in this embodiment formed from a series of parallel rollers 118*a*' that each extend transversely across the frame 112*a*' and together extend longitudinally along the frame, the parallel rollers 118*a*' engaging a closed belt 120*a*' that longitudinally spans the frame 112*a*', such engagement being sprocket-driven for example.

A series of mounting-plates 122*a*' are affixed to and distributed along the length of the belt 120*a*'. Each mounting-plate 122*a*' retains a block of floatation 108*a*' that radiates outward from the belt 120*a*'. Each block of floatation 108*a*' retains a scoop 106*a*' that radiates outward from the block of floatation 108*a*', such that the scoop 106*a*', the block of floatation 108*a*' and the mounting-plate 122*a*' form a vane 104*a*'. The scoops 106*a*' are formed to engage the fluid flow Fw when immersed, such that the fluid flow Fw urges against the scoop 106*a*' and in response the scoop 106*a*' moves downstream, transmitting its kinetic energy to the belt 120*a*' through the mounting-plate 122*a*'.

Those skilled in the art will recognize that the scoop 106*a*', the block of floatation 108*a*' and the mounting-plate 122*a*' could be merged or combined with other parts to form a vane 104*a*' in a different manner, for example by building floatation into the scoop 106*a*' or configuring the block of flotation 108*a*' to have a scoop-like shape. In this embodiment, there is an even number of vanes 104*a*', in this embodiment six vanes 104*a*'.

As shown in FIG. 1, one embodiment of a scoop 106*a*' has two separate fixed chambers 124*a*' with oppositely facing mouths 126*a*' that align with the belt 120*a*', such that any water flow Fw with a component normal to one of the mouths 126a' will urge against the scoop 106a'.

Depending on the position of the belt 120a', some of the vanes 104a' radiate upward above the frame 112a', others of the vanes 104a' radiate downward below the frame 112a', and still others of the vanes 104a' radiate longitudinally from the frame 112a'. As deployed on the surface of a water flow Fw, the liquid-flow transducer 101a' floats on the surface of the water flow Fw, supported by the buoyancy of those of those blocks of floatation 108a' that are at that time radiating downward below the frame 112a'. In this embodiment, the buoyancy of those blocks of floatation 108a' supports the whole converting apparatus 100'.

The frame 112a' can be held in place against the flow Fw by anchor lines 128a' or other means. Those vanes 104a' that radiate downward from the conveyor 102a', and that are thus immersed in the flow Fw, are urged along by the flow Fw, thereby urging the belt 120a' to rotate the rollers 118a' as the frame 112a' remains in place.

Figure 3:
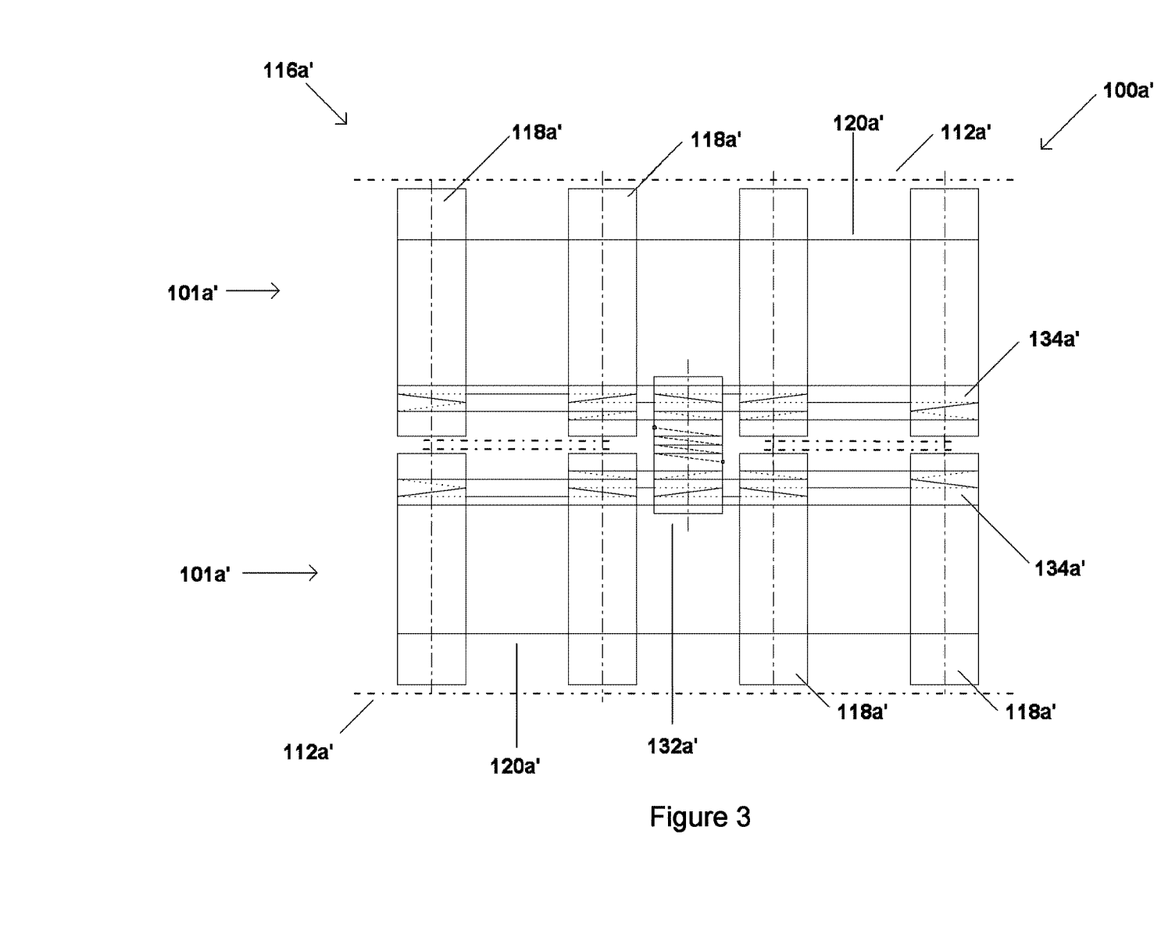
FIG. 3 is a plan view detailing a cable-drive on the array of FIG. 2.

The frame 112a' additionally supports the superstructure 110', which includes for example an operations deck 130'. The liquid-flow transducer 101a' further includes a power take-off 132a' coupled by cable-drives 134a' to the rollers 118a', to transfer a portion of the power from the rollers 118a' to a load L, for example a generator supported on the operations deck 130'. FIG. 3 shows the placement and coupling of the power take-off 132a' in greater detail. This arrangement helps equalize the tensions in the belt drive over its entire length.

Those skilled in the art will thus appreciate that this embodiment teaches an apparatus for converting energy 100 from a fluid flow F, having a first fluid-flow transducer 101 with a frame 112 anchorable 128 against the flow F, an elongated conveyor 102 supported by the frame 112, and a plurality of vanes 104 distributed along the conveyor 102, adapted to engage the fluid flow F and to drive the conveyor 102 in response to urging of the fluid flow F, and a power take-off 132 coupled to be driven by the conveyor 102 and adapted to drive a load L.

(ii) Second Embodiment

Figure 4:
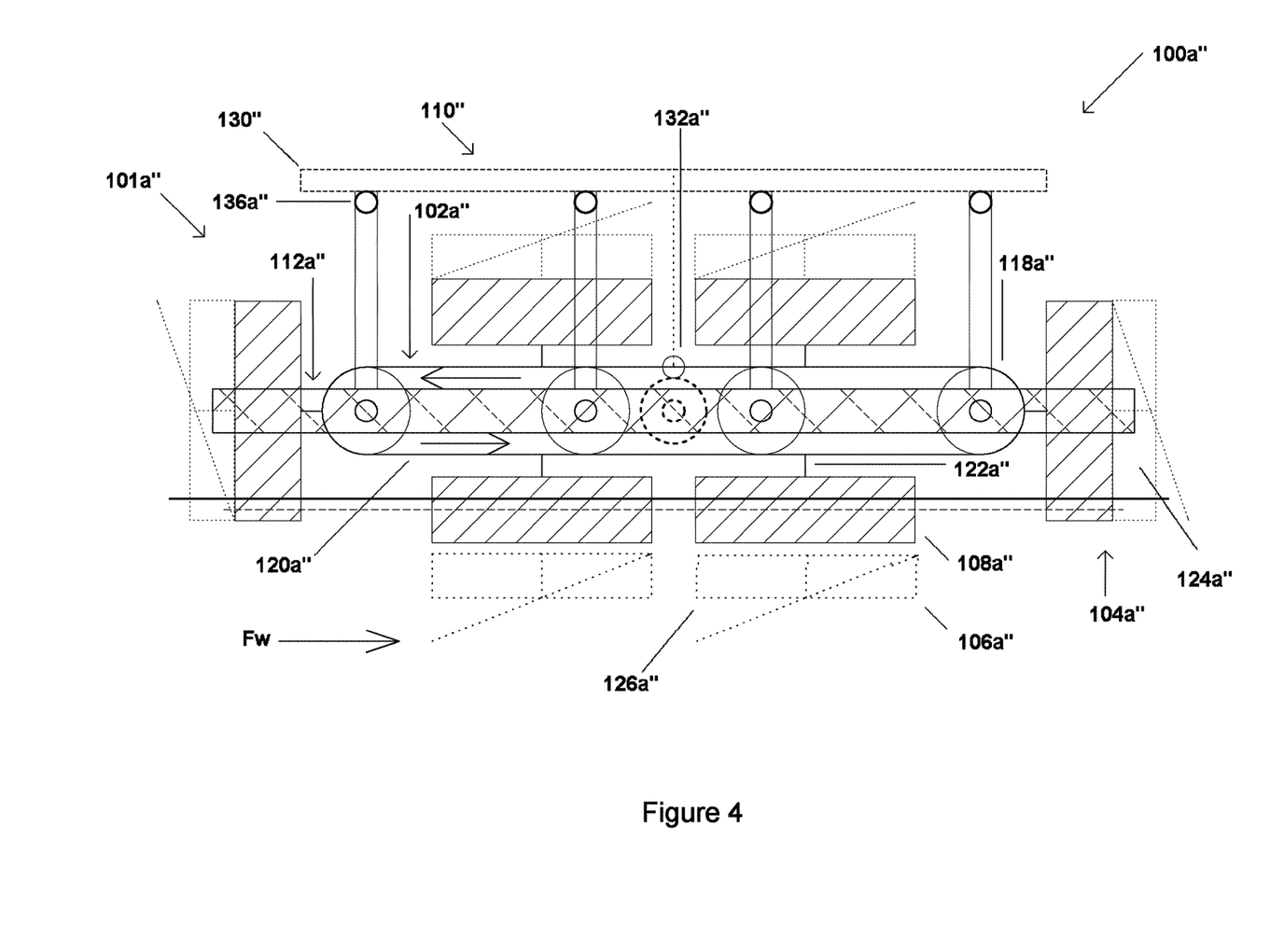
FIG. 4 is a side elevation of a second embodiment of a fluid-flow transducer—a liquid-flow transducer in accordance with aspects of the present invention.

FIG. 4 shows a second embodiment of a liquid-flow transducer 101a". The second embodiment liquid-flow transducer 101a" is similar to the first embodiment liquid-flow transducer 101a' in many respects.

One difference is that the frame 112a" includes translation-couplings 136a" for slidably supporting the superstructure 110", as will be described further below.

Figures 5A, 5B:
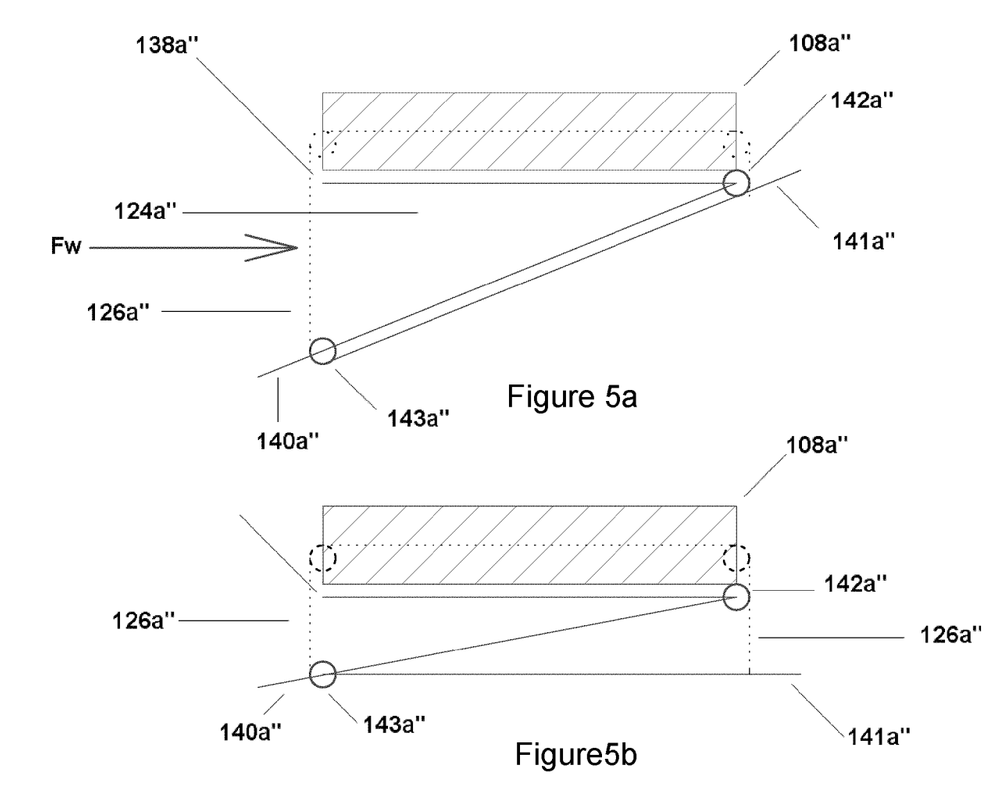
FIG. 5a is a side elevation of a scoop on the liquid-flow transducer of FIG. 4, with a first blade extended and a second blade retracted.
FIG. 5b is a side elevation of a scoop on the liquid-flow transducer of FIG. 4, with a first blade partially extended and a second blade partially extended.

Another difference is that the second embodiment liquid-flow transducer 101a" includes a more sophisticated second embodiment scoop 106a", as best illustrated in FIGS. 5a and 5b. The second embodiment scoop 106a" includes a base-plate 138a" that suspends a rotatable first blade 140a" from a first cable-operated hinge 142a". A rotatable second blade 141a" is suspended from the first blade 140a" by a second cable-operated hinge 143a". This more sophisticated second embodiment scoop 106a" allows the first blade 140a" and the second blade 141a" to be trimmed using with the first cable-operated hinge 142a" and the second cable-operated hinge 143a" to better match the direction and other characteristics of the water flow Fw in which the scoop 106a" is immersed. This embodiment also allows the blades 140a", 141a" to be retracted when returning above the water flow Fw, so that less clearance and resistance to movement in the air return path is required in the superstructure 110".

(iii) Third Embodiment

Figure 6A:
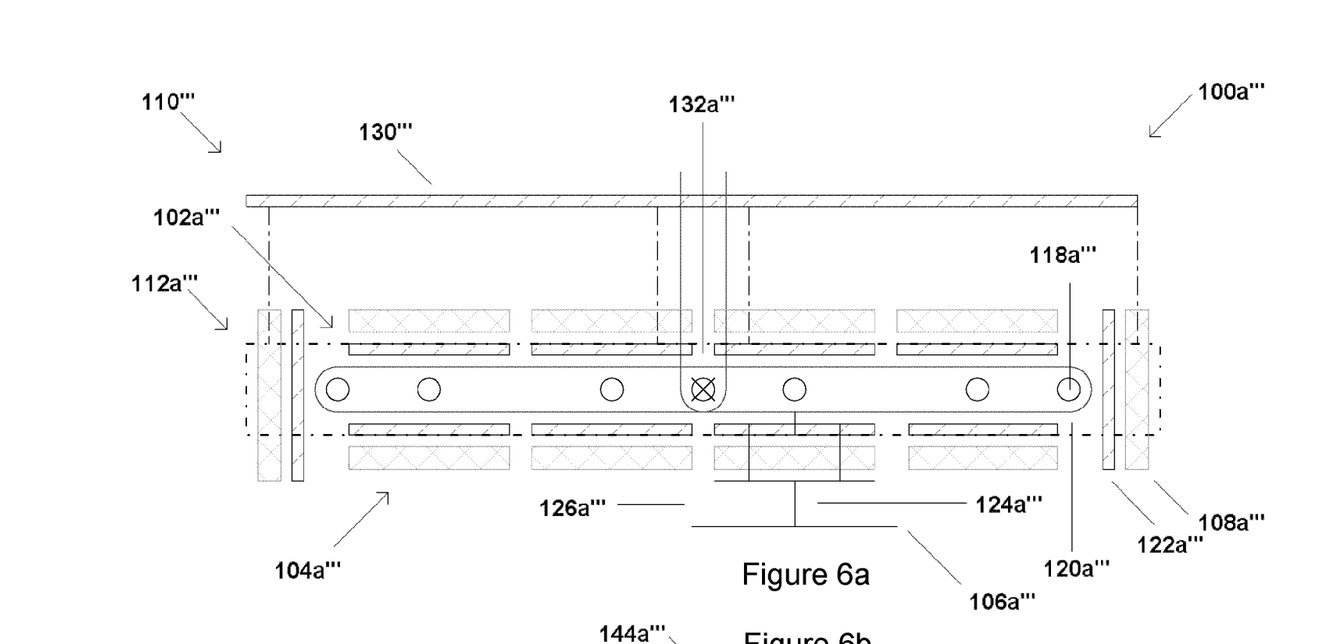
FIG. 6a is a side elevation of a third embodiment of a fluid-flow transducer—liquid-flow transducer in accordance with aspects of the present invention.
Figure 6B:
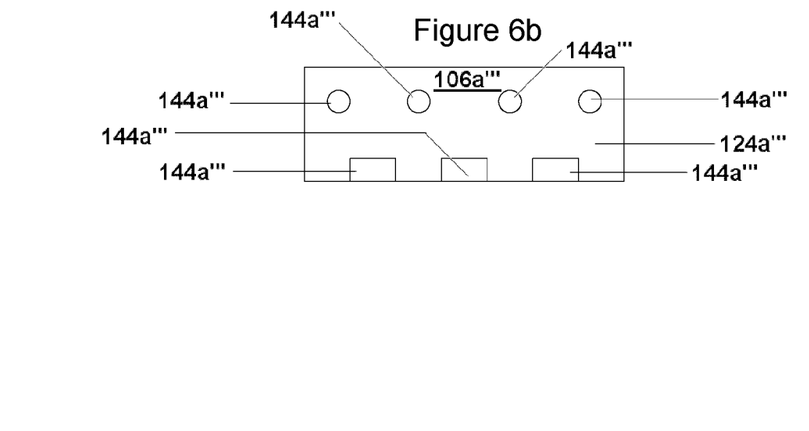

FIGS. 6a and 6b show a third embodiment of a liquid-flow transducer 101a'". The third embodiment liquid-flow transducer 101a'" is similar to the first embodiment liquid-flow transducer 101a' and the second embodiment liquid-flow transducer 101a" in many respects.

One difference is that the third embodiment liquid-flow transducer 101a'" includes ten instead of six vanes 104a'".

Another difference in this third embodiment is that the fixed chambers 124a'" in each scoop 106a'" are connected by at least one passage 144a'" through which the water flow Fw can pass.

(iv) Fourth Embodiment

Figure 8:
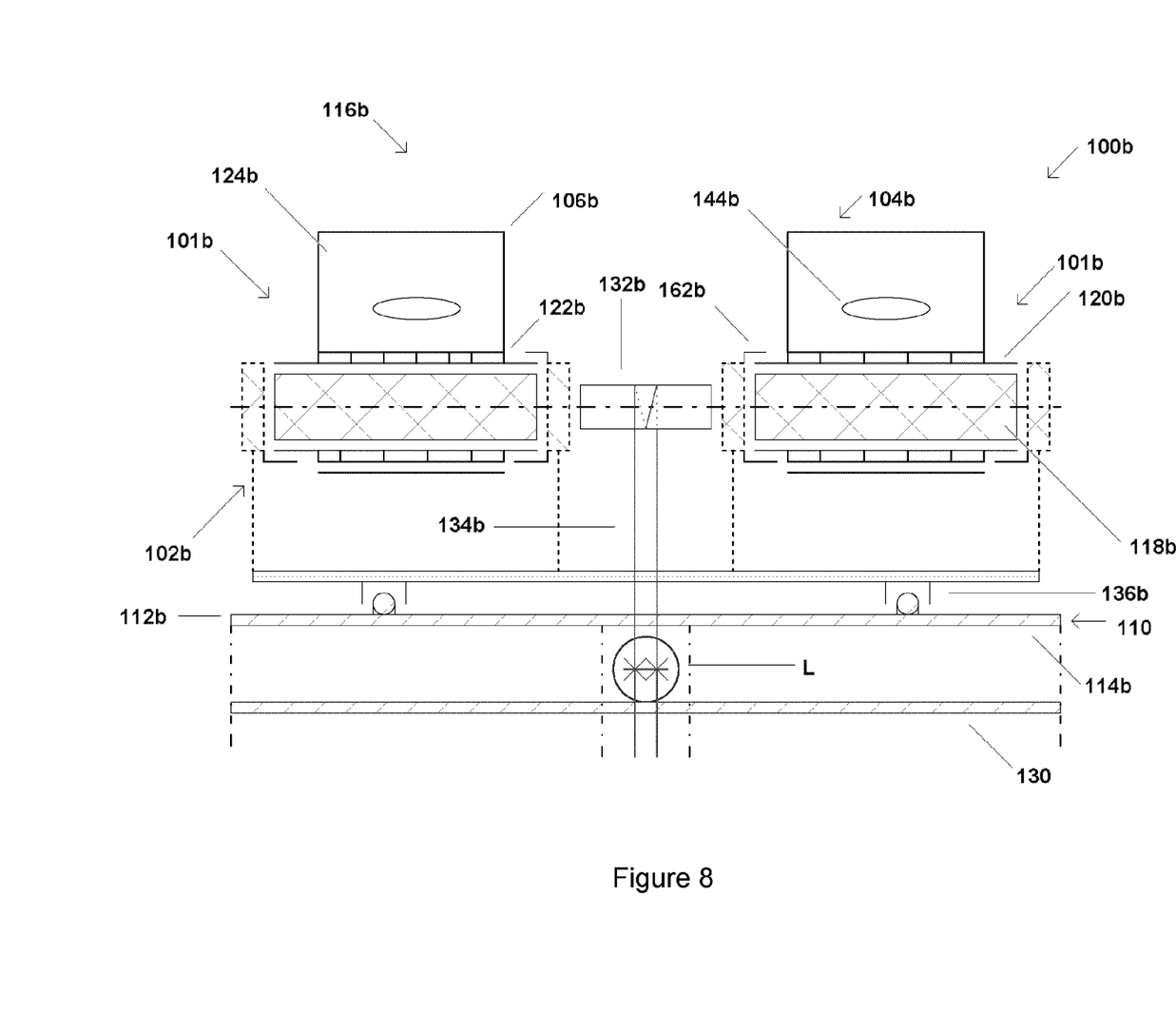
FIG. 8 is a cross-sectional view of the gas-flow transducer of FIG. 7, viewed along the cutting plane A-A.

FIGS. 7 and 8 show a first embodiment of a gas-flow transducer 101b, which nevertheless has many similarities to the previously described liquid-flow transducer 101a embodiments, departing to adapt to harnessing a gas flow in place of a liquid flow.

The gas-flow transducer 101b is built on a frame 112b of web beams 114b. The frame 112b supports a conveyor 102b, in this embodiment formed from a series of parallel rollers 118b that transversely span the frame 112b and together engage a belt 120b that longitudinally spans the frame 112b, such engagement being via sprockets for example. The frame 112b may include guide-brackets 162b to help guide and retain the belt 120b.

A series of mounting-plates 122b are affixed to and distributed along the length of the belt 120b. Each mounting-plate 122b pivotally retains one edge of a sail 106b, which radiates outward from the belt 120b when in a hoisted position and which abuts the mounting-plate 122b when in a retracted position. In this regard, the mounting plate 122b and the sail 106b form a vane 104b.

Each sail 106b has a preformed pocket 124b that aligns with the belt 120b, such that any air flow Fa with a component normal to the pocket 124b will urge against the sail 106b and in response the sail 106b will move downstream, transmitting its kinetic energy to the belt 120b through the mounting plate 122b. In this embodiment, at least some of the sails 106b have a passage 144b through the pocket 124b through which the air flow Fa can pass.

Depending on the position of the belt 120b, some of the vanes 104b are hoisted and radiate upward above the frame 112b in an extended position, while other of the vanes 104b are retracted against their respective mounting-plates 122b in an retracted position for low-drag travel below the belt 120b back to the top of the frame 112b. An energy-accumulator 164b (for example as taught in U.S. Pat. No. US7,690,900) can be connected between any respective mounting-plate 122b and sail 106b, both to damp the extending and retracting of each sail 106b and to harness the energy of extending and retracting.

The frame 112b can be held in place against the air flow Fa by the superstructure 110, which in turn is held in place by one or more anchor lines 128 or other means. Those sails 106b that radiate outward and upward from the belt 120b, and are thus immersed in the air flow Fa, are urged along by the flow Fa, thereby urging the belt 120b to rotate the rollers 118b as the frame 112b remains in place.

The gas-flow transducer 101b further includes a power take-off 132b coupled to the rollers 118b, to transfer some of the power from the rollers 118b to a load L, for example a generator supported on the operations deck 130.

The gas-flow transducer 101b includes a turntable-mount 136b to rotatably mount the gas-flow transducer 101b on the superstructure 110 so that the gas-flow transducer 101b can rotate to point into the air flow Fa (the wind).

Those skilled in the art will thus appreciate that this embodiment teaches an apparatus for converting energy 100 from a fluid flow F, having a first fluid-flow transducer 101 with a frame 112 anchorable 128 against the flow F, an elongated conveyor 102 supported by the frame 112, and a plurality of vanes 104 distributed along the conveyor 102, adapted to engage the fluid flow F and to drive the conveyor 102 in response to urging of the fluid flow F, and a power take-off 132 coupled to be driven by the conveyor 102 and adapted to drive a load L.

(v) More Advanced Arrays

As described above, fluid-flow transducers 101 can be combined together into an array 116. With reference now to FIGS. 9 to 12, more advanced arrays 116 will be further described.

Figure 9:
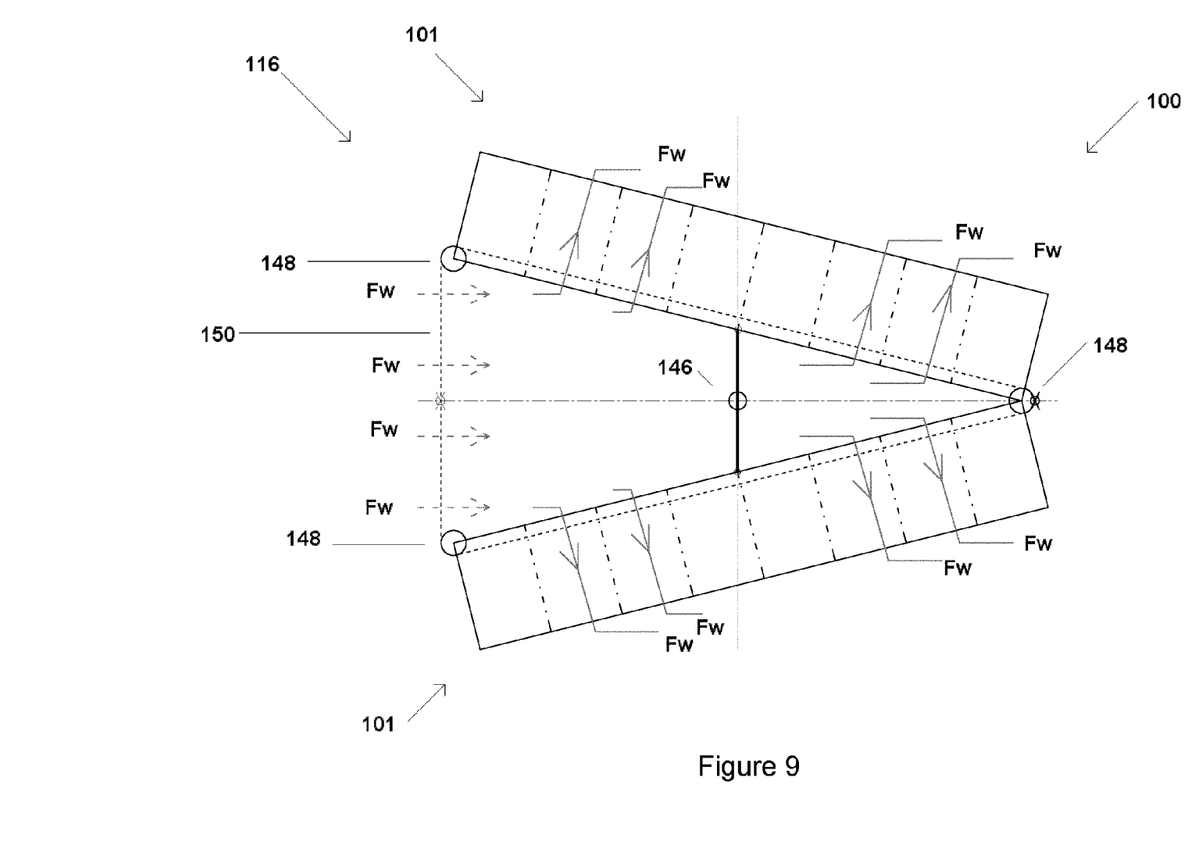
FIG. 9 is a plan view of a pivoting array of two fluid-flow transducers, the two transducers forming a vertex at a downstream end.
Figure 10:
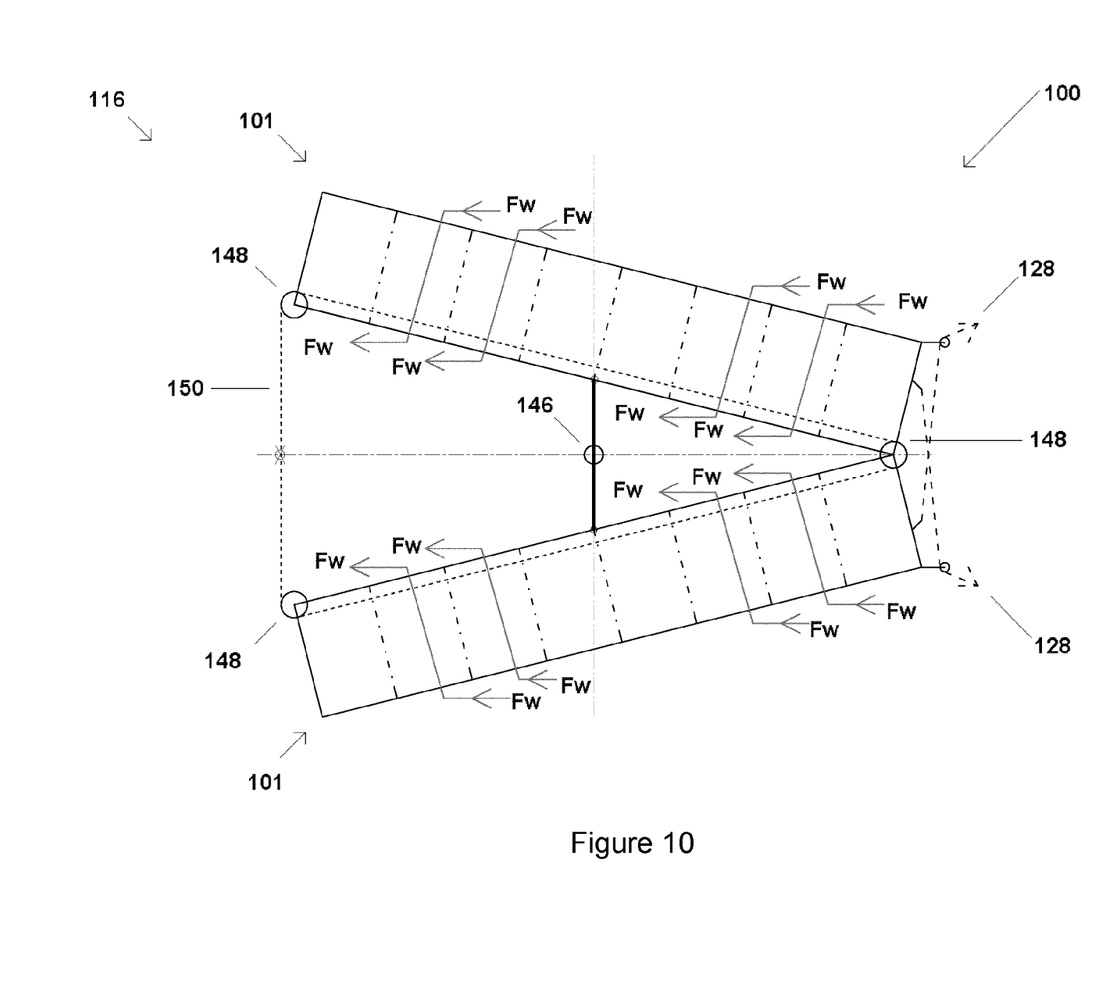
FIG. 10 is a plan view of a pivoting array of two fluid-flow transducers, the two transducers forming a vertex at an upstream end.
Figure 11:
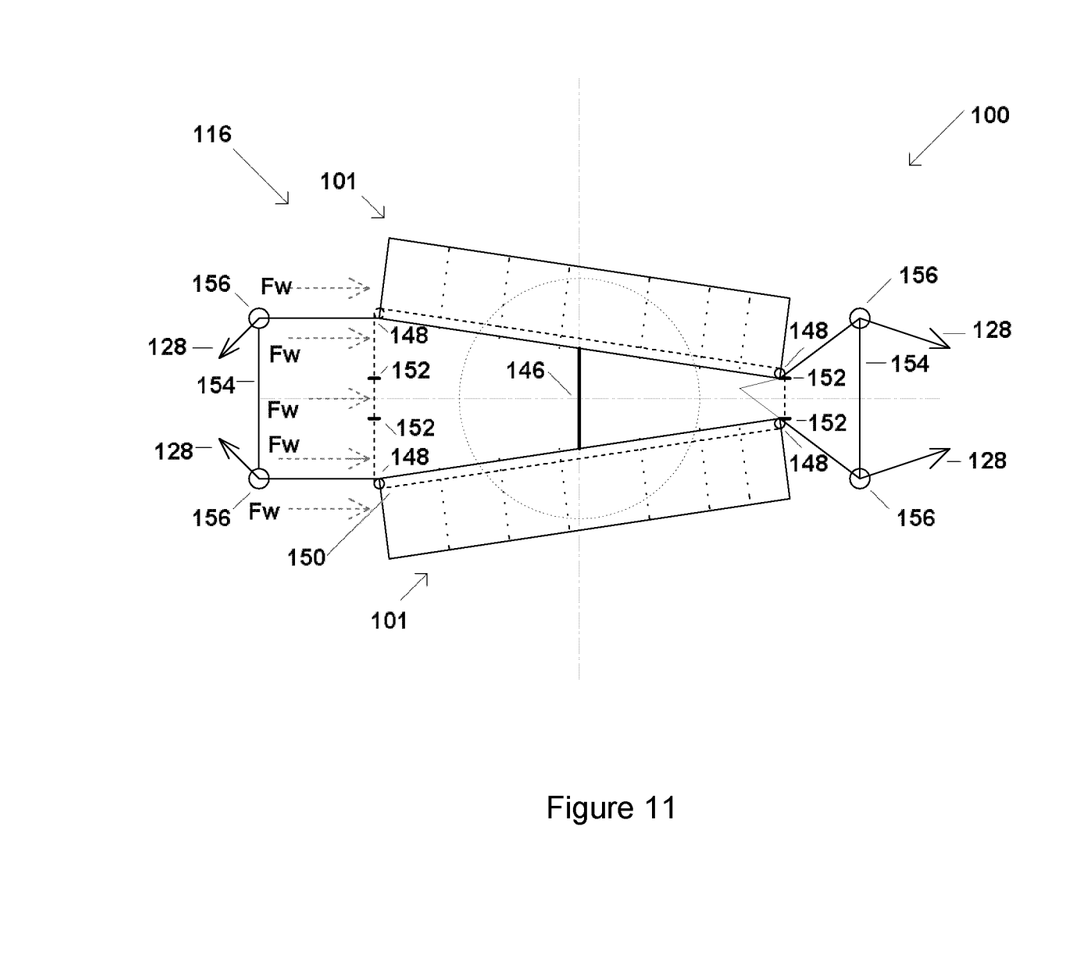
FIG. 11 is a plan view of a pivoting array of two fluid-flow transducers, the two transducers not converging to a vertex.

The array 116 described above with respect to FIG. 2 was a rigid, parallel array 116; however, that need not be the case. As best seen in FIGS. 9 to 11, liquid-flow transducers 101a may be pivotally coupled, for example by a linkage 146a, for example connecting the adjacent liquid-flow transducers 101a at midlength.

With reference back to FIG. 5, the frame 112a of a liquid-flow transducer 101a can be coupled to its superstructure 110 by a translation coupling 136a such that the superstructure 110 can remain in place while its supporting liquid-flow transducers 101a below are adjusted in the water flow Fw. It will be recalled that gas-flow transducers 101b supported by the superstructure 110 rest on a turntable-mount 136b and so are free to orient into the ambient air flow Fa.

Adjacent liquid-flow transducers 101a may have pulleys 148a deployed at either end through which a control-cable 150a is threaded, as illustrated in a closed loop, to constrain the relative movement of the adjacent liquid-flow transducers 101a. As illustrated, the control-cable 150a may include adjustable stops 152a, to urge against the pulleys 148a and further constrain movement of the adjacent liquid-flow transducers 101a.

As best seen in FIGS. 9 and 10, pivotal adjustment of adjacent liquid-flow transducers 101a can help orient the vanes 104a with respect to the water flow Fw. As best seen in comparing FIGS. 9 and 10 with FIG. 11, the liquid-flow transducers 101a may be placed in abutment at one end (FIGS. 9 and 10) or not (FIG. 11).

As best seen in FIG. 11, a pier 154a supported for example by buoys 156a, may extend transversely upstream and/or downstream of the liquid-flow transducers 101a and direct the anchor lines 128a into position to engage the stops 152a on the control-cable 150a to limit the pivotal adjustment.

Figure 12:
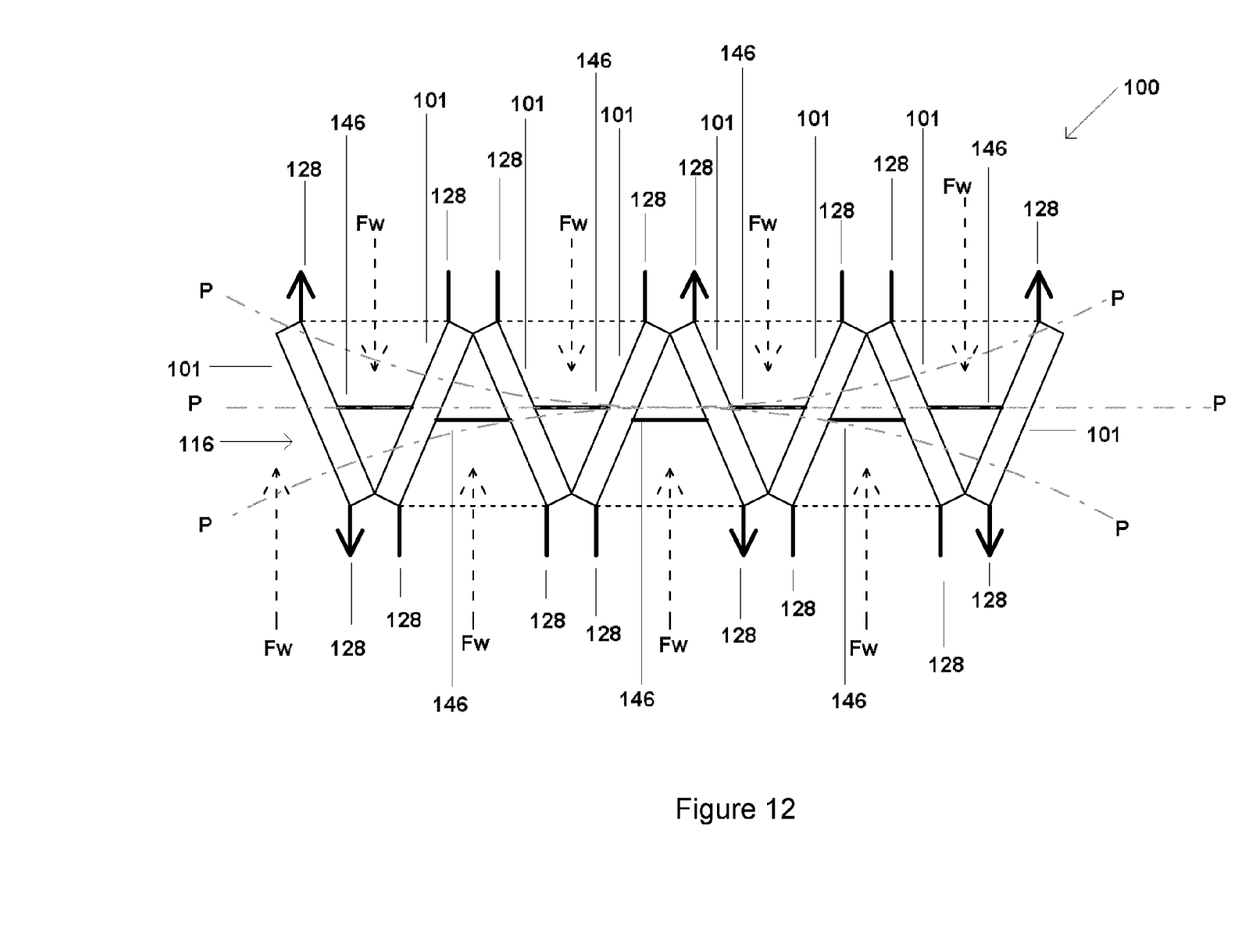
FIG. 12 is a plan view of a pivoting array of eight fluid-flow transducers, the array extending along a path.

With reference now to FIG. 12, it will be seen that a succession of adjacent fluid-flow transducers 101 can be chained together, for example to span a river. Those skilled in the art will appreciate that such arrays 116 can be chained together along a curved path P, for example to better harness the particular water flow Fw.

(c) Operation of Specific Embodiments

With reference now to FIGS. 1 to 12, the operation of these specific embodiments of the invention will now be described.

In general terms, the user anchors the converting apparatus 100 such that at least one fluid-flow transducer 101 is proximate a flow F, such that some of its plurality of vanes 104 are urged upon by the flow F and in turn urge the conveyor 102 into motion, since the generating apparatus as a whole is anchored. The moving conveyor 102 brings unurged vanes 104 into contact with the flow F and returns urged vanes 104 from the downstream end of the conveyor 102 back to the upstream end of the conveyor to once again be urged upon by the flow F. In transit, the vanes 104 may be trimmed, to more efficiently engage the flow F, including as the flow changes, and retracted during the return passage. In the case of a liquid-flow transducer 101a, the vanes 104 in contact with the flow F additionally support the fluid-flow transducer 101a with floatation 108.

Those skilled in the art will thus appreciate the description of this operation teaches a method of converting energy from a fluid flow F, including distributing a plurality of vanes 104 along an elongated conveyor 102 and anchoring 128 the conveyor 102 proximate the flow F such that some of the plurality of vanes 104 are urged upon by the flow F and in response urge the conveyor 102 into motion. The description further teaches such a method that includes supporting the conveyor 102 on the flow F with the some of the plurality of vanes 104 urged upon by the flow.

A power take-off 132 coupled to the conveyor 102 (and in particular the rollers 118 via a cable-drive 134) can extract a portion of the kinetic energy of the conveyor 102 and supply it to a load L, for example a generator.

The converting apparatus 100 can include an array 116 of fluid-flow transducers 101, coupled together either fixedly or pivotally for example. In the case of pivotally coupled transducers 101, a user can adjust the pivot angles to more effectively position the vanes 104 in the flow F and to extend the array 116 along a path P. In the case of gas-flow transducers 101b mounted on a turntable 136b, a user can allow the gas-flow transducers 101b to align their vanes with the ambient gas flow (wind.)

(d) Description Summary

Thus, it will be seen from the foregoing embodiments and examples that to there has been described a way to generate energy from a fluid flow, using a fluid-flow transducer having a frame anchorable against the flow, an elongated conveyor supported by the frame, and a plurality of vanes distributed along the conveyor, adapted to engage the fluid flow and to drive the conveyor in response to urging of the fluid flow, in combination with a power take-off coupled to be driven by the conveyor and adapted to drive a load.

While specific embodiments of the invention have been described and illustrated, such embodiments should be considered illustrative of the invention only and not as limiting the invention as construed in accordance with the accompanying claims. It will be understood by those skilled in the art that various changes, modifications and substitutions can be made to the foregoing embodiments without departing from the principle and scope of the invention expressed in the claims made herein.

While the invention has been described as having particular application for generating electricity, those skilled in the art will recognize it has wider application.

What is claimed is:

1. An apparatus for converting energy from a fluid flow, comprising:
   a. a first fluid-flow transducer, having
      i. a frame anchorable against the flow,
      ii. an elongated conveyor supported by the frame, and
      iii. a plurality of vanes distributed along the conveyor to drive the conveyor in response to urging of the fluid flow,
         a) each of the plurality of vanes having a scoop with oppositely facing mouths adapted to engage the fluid flow, wherein at least one of the plurality of vanes has a scoop wherein the oppositely facing mouths are trimmable, further including at least one cable-operated hinge adapted to trim the oppositely facing mouths, and b. a power take-off coupled to be driven by the conveyor and adapted to drive a load.

2. An apparatus as claimed in claim 1, wherein the at least one of the plurality of vanes has an extended position and a retracted position.

3. An apparatus as claimed in claim 1, wherein at least one of the plurality of vanes has at least one passage therethrough through which the fluid flow can pass.

4. An apparatus as claimed in claim 1, wherein the conveyor includes:
   a. a plurality of rollers, each roller respectively extending transversely across the frame and the plurality of rollers extending longitudinally along the frame, and
   b. a closed belt engaging the plurality of rollers for travel thereover.

5. An apparatus as claimed in claim 1, wherein the first fluid-flow transducer is a liquid-flow transducer.

6. An apparatus as claimed in claim 5, wherein the plurality of vanes includes flotation sufficient to support the apparatus.

7. An apparatus as claimed in claim 6, wherein the plurality of vanes is an even number.

8. An apparatus as claimed in claim 6, further including a second fluid-flow transducer that is a gas-flow transducer, having:
   a. a second elongated conveyor supported by the frame and coupled to drive the power take-off, and
   b. a second plurality of vanes distributed along the second conveyor to drive the second conveyor in response to urging of the gas flow.

9. An apparatus as claimed in claim 8, wherein at least one of the second plurality of vanes has an extended position and a retracted position, and wherein the at least one of the second plurality of vanes has an energy-accumulator coupled to harness energy from the at least one of the second plurality of vanes when the at least one of the second plurality of vanes moves between the retracted position and the extended position.

10. An apparatus as claimed in claim 9, wherein the second conveyor is supported on the frame via a turntable.

11. An apparatus as claimed in claim 1, wherein the apparatus further includes a second fluid-flow transducer coupled to the power take-off wherein the first fluid-flow transducer and the second fluid-flow transducer are both liquid-flow transducers.

12. An apparatus as claimed in claim 11, wherein the first fluid-flow transducer and the second fluid-flow transducer are connected together in a fixed, parallel array.

13. An apparatus as claimed in claim 11, wherein the first fluid-flow transducer and the second fluid-flow transducer are connected together in a pivoting array.

14. An apparatus as claimed in claim 13, wherein the pivoting array includes a further plurality of fluid-flow transducers pivotally connected together along a path.

15. An apparatus as claimed in claim 13 further including linkage pivotally connecting the first fluid-flow transducer and the second fluid-flow transducer at midlength.

16. An apparatus as claimed in claim 15, further including:
   a. a plurality of pulleys respectively deployed at either end of the first fluid-flow transducer and the second fluid-flow transducer, and
   b. a control-cable threaded though the plurality of pulleys in a closed-loop configuration to constrain the relative movement of the first fluid-flow transducer and the second fluid-flow transducer.

17. An apparatus as claimed in claim 16, wherein the control-cable is set to place one end of the first fluid-flow transducer and the second fluid-flow transducer in abutment.

18. A method of converting energy from a fluid flow, comprising:
   a. distributing a plurality of vanes along an elongated conveyor, each of the plurality of vanes having a scoop with oppositely facing mouths adapted to engage the fluid flow, wherein at least one of the plurality of vanes has a scoop wherein the oppositely facing mouths are trimmable, further including at least one cable-operated hinge adapted to trim the oppositely facing mouths,
   b. anchoring the conveyor proximate the flow such that some of the plurality of vanes are urged upon by the flow and in response urge the conveyor into motion, and
   c. trimming the oppositely facing mouths of the at least one of the plurality of vanes using the at least one cable-operated hinge.

19. A method as claimed in claim 18, further including supporting the conveyor on the flow with the some of the plurality of vanes urged upon by the flow.

\* \* \* \* \*